O. P. MYERS.
Cotton Harvesters.

No. 134,157. Patented Dec. 24, 1872.

Witnesses.
Oliver P. Myers, Inventor,
by Jo. Abbott, Attorney.

UNITED STATES PATENT OFFICE.

OLIVER P. MYERS, OF CANTON, OHIO.

IMPROVEMENT IN COTTON-HARVESTERS.

Specification forming part of Letters Patent No. 134,157, dated December 24, 1872; antedated December 18, 1872.

*To all whom it may concern:*

Be it known that I, OLIVER P. MYERS, of Canton, in the county of Stark and State of Ohio, have invented certain new and useful Improvements in Cotton-Pickers; and that the following is a full, clear, and exact specification thereof, which will enable others skilled in the art to make and use the said invention.

It is well known to persons familiar with cotton-growing that the ripening of the cotton does not take place all at once, and that the same field often presents to the cotton-picker bolls or pods of perfectly-ripe cotton, others which are but partially ripened, and others—usually lower down on the bush—which are scarcely opened; and it is also well known that it is very desirable to pick only the ripe cotton, as this can be taken out with only the seeds hanging to it, while the partially-ripened cotton will usually hang to the pod, which thus becomes mixed in with the cotton, from which it is difficult to remove it.

The object of my invention is to obtain a machine for picking cotton which can be run over the cotton-plants without injuring them, and which will gather the ripe cotton with only the seeds hanging to it, without pulling off the partially-ripened cotton and the pods which would ordinarily hang to it, so that the operator can go over the field with the machine several times, gathering only the ripe cotton each time, without injuring the plants so as to affect the maturing of the unripe cotton, thus harvesting a full crop of ripe cotton by mechanical means and in a most effectual manner. To this end, said invention consists in the construction of a single large picker-cylinder covered with a close surface of bristles, which form a complete bristle-brush face extending the entire length of the cylinder, which picker-cylinder is mounted in a frame supported on wheels which run on each side of the cotton-plant row, and is revolved by suitable mechanism, so that while being drawn over the cotton-plants it will present a large unbroken bristle-surface to the pods, and will seize upon and pick the all-ripe cotton from the pods without drawing out the unripe cotton or injuring the pods or plants. Said invention also consists in the combination, with the large bristle-brush picker-cylinder, of a cleaning-cylinder geared to the picker-cylinder, and having straight wire-points on its surface running in contact with the picker-cylinder, said cleaning-cylinder serving to draw the cotton from the face of the picker-cylinder and to deliver it into a receptacle provided for it in the rear of the machine.

Figure 1:
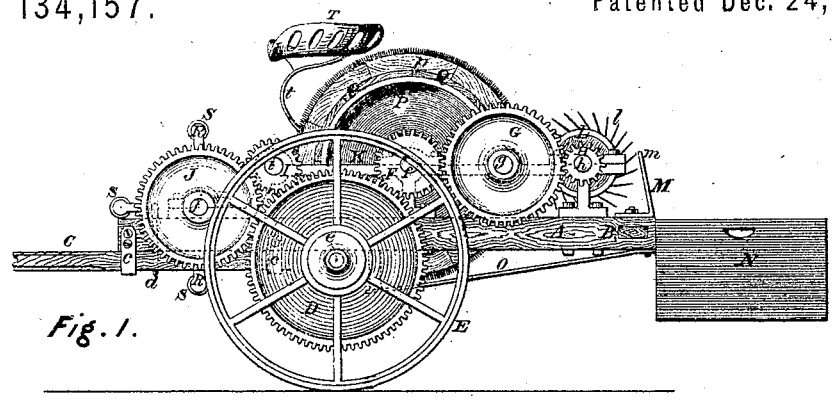
Figure 2:
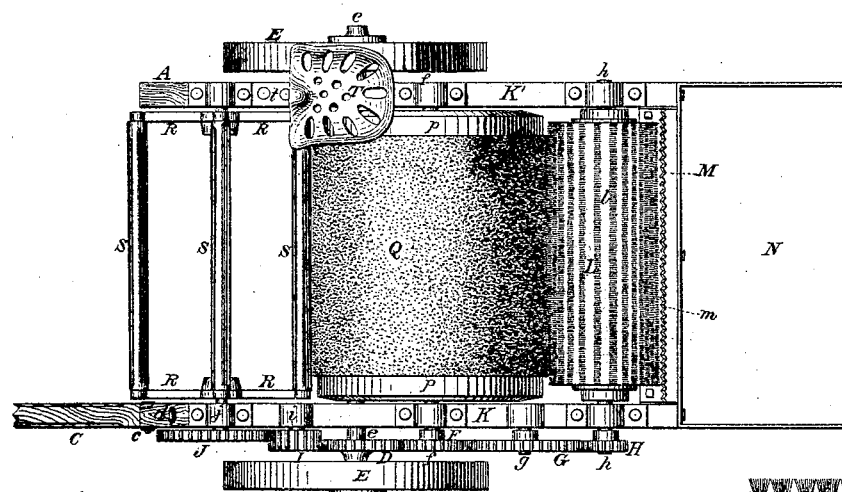
Figure 3:
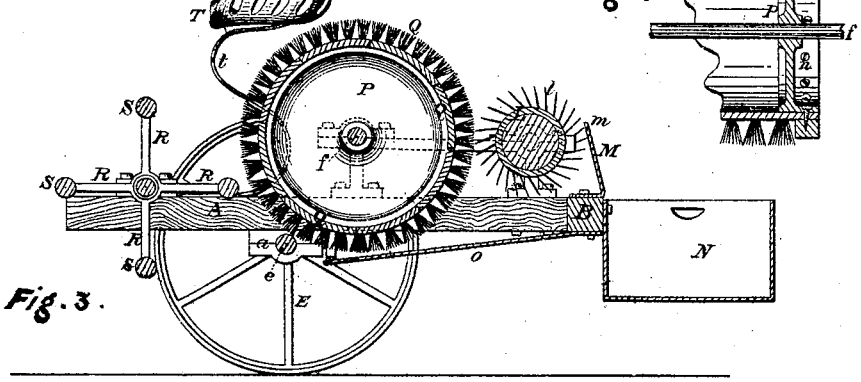
Figure 4:
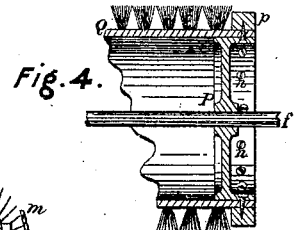

In the accompanying drawing, Figures 1 and 2 are side view and plan view of a machine embodying my invention. Fig. 3 is a longitudinal section of the same. Fig. 4 is a partial longitudinal section of the picker-cylinder.

A B A is the frame of the machine, on one side of which is secured the draft-tongue C by means of clips $c$ $c$ and a pin, $d$, or other suitable devices, and on the other side of which is supported the seat T by means of the spring $t$. The wheels E E, on which the machine is supported, have a ratchet-connection in their hubs with the main driving-shaft $e$, which is arranged in boxes $a$ $a$ under the frame-pieces A A, and on which is secured the main driving gear-wheel D. This gear-wheel D meshes into a pinion, F, on the shaft $f$ of the picker-cylinder P Q, which pinion meshes into a wheel, G, hung on a shaft, $g$, secured in the journal-frame K, which wheel meshes into a pinion, H, on the shaft $h$ of the cleaning-cylinder L $l$. The gear-wheel D also meshes into a double or broad-faced pinion, I, hung on a shaft, $i$, in the journal-frame K, which pinion meshes into the wheel J on the shaft $j$ of the reel R S, the object in using the double-faced pinion I being to allow the wheel J to set in past the wheel D, so as to bring the shaft $j$ of the reel nearer the shaft of the picker-cylinder P Q, and thus allow of the use of a reel of a less diameter than would be otherwise convenient. The journal-frames K referred to consist of castings of the general form indicated, which are bolted to the frame-pieces A A, and on which are formed journal-boxes for the shafts of the reel, picker-cylinder, and cleaning-cylinder; but, if preferred, the journal-boxes for these several shafts may be formed on separate standards secured on the frame-pieces, or the boxes of the shafts $f$ $h$ of the picker and cleaning-cylinders can be united in a frame-piece, K', as shown on one side of the machine, which I consider the preferable plan, as it is very essential to preserve a constant distance between the shafts of said cylinders.

The picker-cylinder P Q consists of the two cylinder-heads, P P, secured on the shaft $f$, on which are secured the sections Q Q of bristle-brushes, which are made with curved backs to fit on the cylinder-heads, and which are conveniently secured thereto by screws $n\ n$, which run through flanges on the heads P, and screw into and through the backs Q into the rim-pieces $p$, which are placed over the ends of the backs Q, as shown in Fig. 4.

The diameter of the picker-cylinder P Q is about three feet, and the number of sections Q of the bristle-brushes can be varied as may be found convenient, it being possible to use only two sections, each a half cylinder; but a larger number, usually six or eight, being more convenient for construction and more readily removed for repair when worn or broken.

The cleaning-cylinder L is conveniently made by driving and turning a wooden cylinder of about ten inches diameter on the shaft $h$, and then covering said cylinder with "wire-card cloth," so called, which consists of leather with bent wires $l$ inserted through it, but which is to be made with somewhat longer and heavier wires for this purpose than are ordinarily used in cotton or woolen cards, and the wires $l$ are also to be made without the bend found in the wires of common cards, and are to be slightly inclined back from the direction of rotation of the cylinder, as shown in Figs. 1 and 3, so that the cotton will readily slip off from them. The points $l$ of the cleaning-cylinder run just in contact with the brush-face of the picker-cylinder P Q; and the cleaner-bar M, which may be made with a straight edge or with a corrugated edge, $m$, as shown, is secured on the frame-piece B with its edge close to the ends of the wire-points $l$, and slightly above the level of the shaft $h$ of the cleaning-cylinder, as shown. A box, N, or other suitable receptacle, is secured behind the frame B to receive the picked cotton, and a shield, O, is secured beneath the frame A B A to prevent the cotton-plants from coming in contact with the picker and cleaning cylinders after having been once acted on by the picker-brushes.

The reel R S consists of the heads R R, between which are arranged the round bars S S, which are hung on pivots or journals at each end, so as to turn freely between the heads R, and this reel is arranged just in front of the picker-cylinder, as shown, the height of the machine being such as to bring the reel-shaft $j$ a little below the general level of the pods on the cotton-plants.

The operation of the machine is as follows: The driver, mounted on the seat T, drives the machine astride a row of cotton-plants, and this forward movement puts the reel and cylinders into rotation, through the action of the ratchets and gearing before described. The reel-bars S S strike the cotton-plants, and, by rolling down the stems, bend the plants over toward the brush-face of the picker-cylinder P Q, and as the machine advances the pods on the plants thus bent over come in contact with the brush-face Q near the lower side of the cylinder P Q, and are kept in contact with said face up to or slightly above the level of the cylinder-shaft, by reason of the gradual straightening up of the plants as the machine advances, in connection with the constant pressure from the reel R S toward the cylinder; and it will be seen that this contact between the brush-face of the picker-cylinder and the cotton-pods over so long an arc of the large cylinder-face will be very certain to catch the ripe cotton on the bristles of the brushes and pick it out, while these bristles would not be of sufficient harshness or stiffness to pull off the pods or unripe cotton, or to injure the plants, as they would be liable to do were they to be made of wire. As the machine continues to advance after the picker-cylinder has removed the ripe cotton from the pods, the plants are gradually bent over in the direction of the movement of the machine, and the shield O and receptacle N slide over them, and when the machine has passed they again spring up to their original position. The cotton picked off and hanging to the brush-face of the picker-cylinder P Q is cleaned off by and onto the points $l$ of the cleaning-cylinder L, which is driven at a somewhat greater velocity than the picker-cylinder P Q, and these points $l$ draw out of the cotton as it comes over onto the cleaner-bar M, thus dropping it into the receptacle N.

The plan of constructing the picker-cylinder of sections of bristle-brushes, as before described, I consider as the preferable plan, as it makes a light and durable construction, which can be readily repaired; but it is evident that other constructions could be used—as, for example, the bristles could be set in thick leather, which could be placed as a covering on the cylinder, or the bristles could be set in a solid wooden cylinder, or into holes in a hollow cast-iron cylinder; and I reserve the right to construct the single large picker-cylinder as I may deem most expedient.

I am aware that Letters Patent No. 53,901, granted to A. Tiensch, April 10, 1866, for improvement in cotton-picking machines, show three cylinders, each provided with distinct and separate brush-disks, and arranged one above the other, and driven by suitable gearing; and I do not claim broadly the plan of picking the ripe cotton from the pods by means of bristle-brushes, however arranged, but confine myself to my particular construction for this purpose.

The gist of my improvement in the picking-cylinder consists in the manner in which I have constructed and applied a bristle-brush surface to the purpose of cotton-picking, viz., by completely covering one cylinder of large diameter from one end to the other with such bristle-surface instead of arranging the bristles in disks on small cylinders, and then multiplying the number of cylinders in order to obtain the proper amount of bristle-brush face to gather all the ripe cotton as the machine passes over the plants, as in prior machines.

The advantages resulting from this improved construction are that a more effective, durable, and cheaper bristle picking-surface is obtained by the use of the single large and completely-covered cylinder than by the several smaller cylinders with separate disks of bristles, as there is a longer arc of contact between the cotton-plants and picker-cylinder; the cylinder picking-surface is complete and unbroken; the bristles set closely together and serve to support each other while acting on the cotton; and only a short train of two wheels is required to revolve the cylinder to which the whole picking-surface is attached. A further advantage due to the arrangement of the whole picking-surface on a single large cylinder consists in the facility which it affords for a cheap and effective means of collecting the picked cotton from the picking-cylinder into the receptacle on the machine, which is effected in this machine by a single wire-pointed cleaning-cylinder, whereas, in prior constructions, the use of several wire-pointed cleaning-cylinders to collect the picked cotton from the several picking-cylinders would have involved such an additional expense of material, gearing, weight, and labor as to have made the machine objectionable in practice, and this necessitated the arrangement of the bristles in disks on the several cylinders, so that cleaning-combs could be used to collect the cotton from the picking-cylinders, from which combs it could be removed by revolving forks to the receptacle, which is a much more expensive and less efficient cleaning and gathering device than that herein described.

What I claim as my invention, and desire to secure by Letters Patent, is—

1. A single large picker-cylinder having an unbroken surface of brush-bristles, when mounted on a frame supported on wheels, and arranged to be rotated by suitable gearing from said wheels while being drawn over the rows of cotton-plants, the diameter of said cylinder being such as to secure a sufficient length of contact of the cotton-pods with the cylindrical picking-surface while the cylinder is being drawn over and in contact with the plants, to insure the gathering of all the ripe cotton, and the said bristle picking-face being continuous and unbroken from one end of the cylinder to the other, substantially as and for the purpose herein specified.

2. The combination, with the large revolving bristle picker-cylinder, of a cleaning-cylinder having a surface of straight wire-points, and revolving in contact with the picker-cylinder, substantially as and for the purpose specified.

3. The combination of a single large bristle picker-cylinder, a cleaning-cylinder with surface of wire-points, rotating in contact with the bristle-face of the picker-cylinder, and a cleaner-bar, with or without a corrugated edge, working in connection with the points of the cleaning-cylinder, substantially as specified.

4. A cotton-picker combining in its construction the following essential elements, viz., a pair of supporting and driving wheels, a frame, a revolving reel, a single large bristle-faced picker-cylinder, a cleaning-cylinder with straight wire-points, a cleaner-bar, and gearing to rotate the reel, picker-cylinder, and cleaning-cylinder from the rotations of the driving-wheels, substantially as specified.

As evidence of the foregoing witness my hand this 15th day of January, A. D. 1872.

OLIVER P. MYERS.

Witnesses:
 JENNIE M. GRANT,
 JOB ABBOTT.